Feb. 21, 1967 J. B. ORR 3,305,082
CONTAINER LID FITTING
Original Filed Sept. 18, 1962
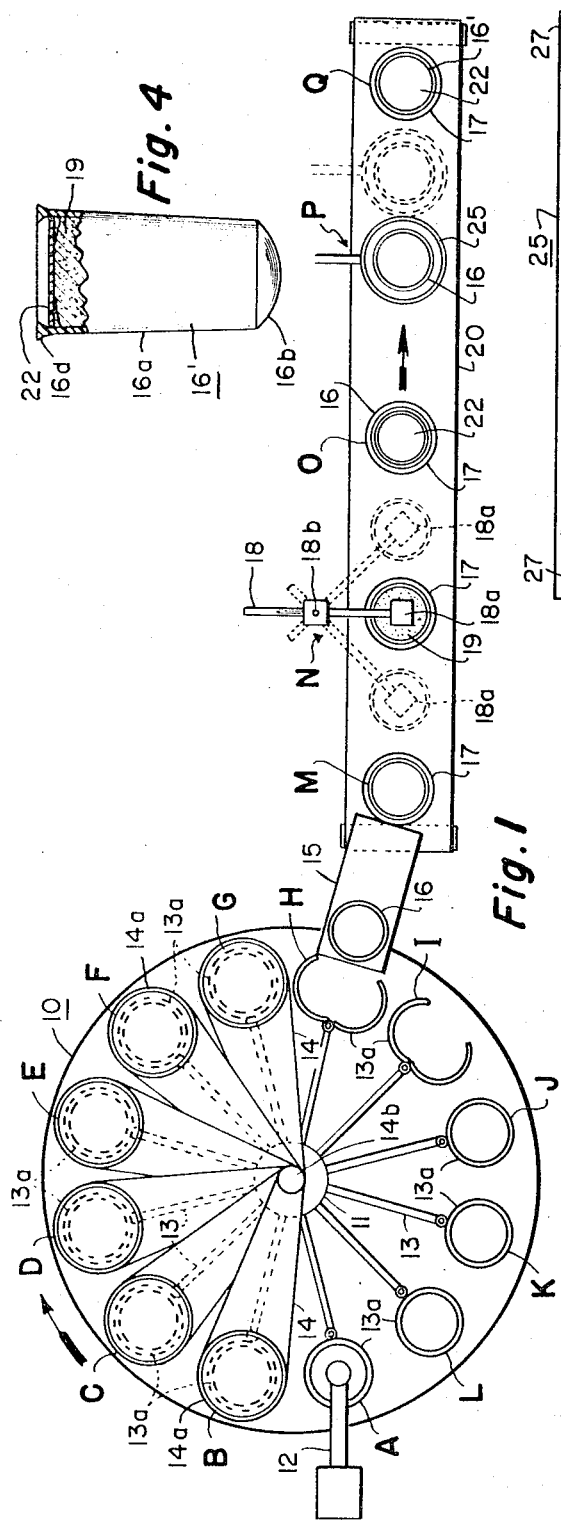
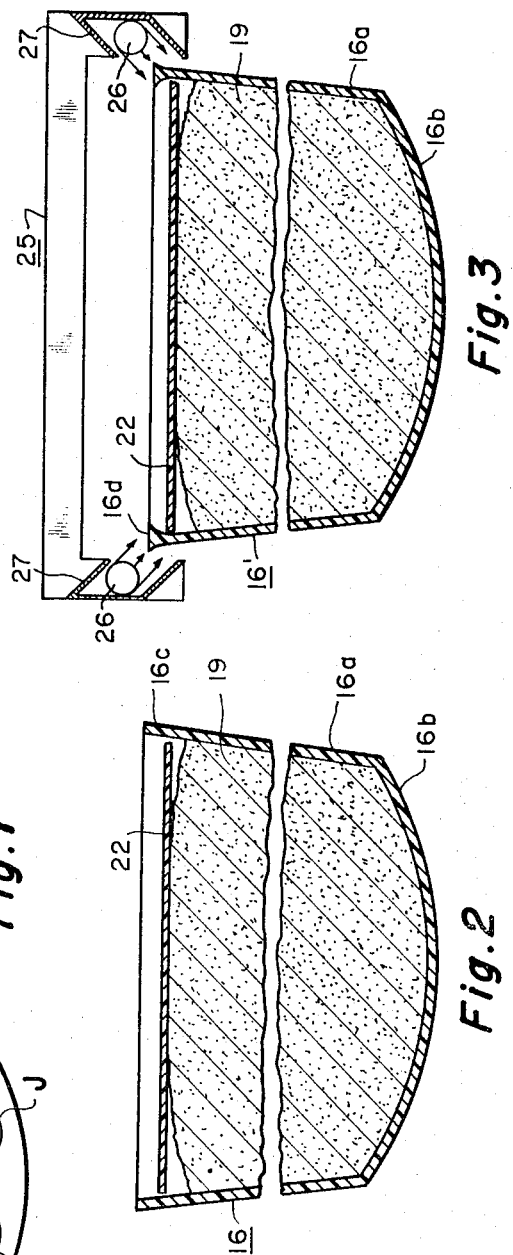
INVENTOR.
John B. Orr
BY
Green, McCallister & Miller
HIS ATTORNEYS

United States Patent Office 3,305,082
Patented Feb. 21, 1967

3,305,082
CONTAINER LID FITTING
John B. Orr, Box 341, Pahoa, Hawaii 96816
Original application Sept. 18, 1962, Ser. No. 224,386. Divided and this application Jan. 21, 1966, Ser. No. 522,314
6 Claims. (Cl. 206—46)

This application is a division of my co-pending application Serial No. 224,386, filed September 18, 1962 and entitled "Container Lid Fitting and Procedure for Making It."

This invention relates to providing a securely fitted lid for an open mouth resin container and particularly, to an improved fitted relationship between the open mouth of a container and its lid.

A phase of the invention relates to procedure for providing an improved fitted relationship, fitting or assembling between the lip of the mouth of a resin container and a lid therefor.

Heretofore difficulty has been encountered in providing a satisfactory lid mounting for open-mouth expanded resin containers, such as of polystyrene. I have produced such containers with exterior threads about the open mouth to which are applied metal screw-on lids. However, I have determined that a container having a screw thread at its mouth must have a minimum wall thickness of about ¼ inch to withstand the forces applied when screwing on the lid. In addition, lids of this type cost as much as the containers and place containers of this type in a disadvantageous price category with respect to those made of cardboard.

I have endeavored to make a vacuum-formed closure or lid for a standard resin container which has a raised lip around the periphery of the lid; I had hoped the lid fit sufficiently snugly against the inside wall of the container to form a satisfactory closure. However, I discovered that when a container is filled with a suitable material, such as cold cream, powder, etc., and the closure or lid is pressed into place, that it will pop out of position if the container is dropped on the floor, thus spilling its contents.

I have also tried molding containers with an undercut groove on the inside into which edges of the closure can be fitted in the hope that this would prevent popping out. I have found that the depth of an undercut groove is limited to a maximum of about 1/32 of an inch from the standpoint of enabling the container to be removed from the male portions of a mold used in forming it. Such a 1/32 inch depth has proved insufficient to prevent popping out. In addition, I desire to produce containers by blow molding rather than steam molding and I know of no way to make such an undercut while blow molding the container, since no male mold portion can be used in a blow molding process.

A further problem arises in blow molding resin containers from expanded bead resin materials such as polystyrene, in that difficulty has been encountered in controlling the wall thickness within close tolerances. For example, the wall thickness of a 16 ounce container may vary from about .035 to .075 of an inch at the mouth. It is thus readily apparent that it is impossible to force-fit a closure into such a container with a tight enough fit to prevent the lid from popping out when the container is dropped.

In accordance with my invention, I am now able to develop an inexpensive procedure for making a fitting or sealing closure with respect to a container, such that the closure or lid cannot be removed after the container has been filled and without the need for employing threads.

It has thus been an object of my invention to develop a new and improved type of fitting or fitted relationship between an open mouth container and a lid or closure, and to meet the factors and solve the problem heretofore encountered in providing a nonthreaded fitting for a resin container;

Another object of my invention has been to develop a simple and inexpensive procedure utilizing a resin container which involves filing it, loosely inserting a lid within its mouth, and then positively sealing or fitting the lid in position within its open mouth;

A further object of my invention has been to develop an improved and more efficient as well as an inexpensive type of fitting for an open mouth expanded resin container of a type such that a container of this type may successfully compete in price with cardboard containers;

A still further object of my invention has been to provide a lid mounting for a resin container which will, when mounted in position, retain a securely mounted and sealed relationship when the container with its contents is dropped on the floor;

These and other objects of my invention will appear to those skilled in the art from the illustrated and described embodiment thereof.

In the drawings:

FIGURE 1 is a schematic plan view, somewhat diagrammatically illustrating apparatus and step by step procedure for producing containers, filling them and capping them in accordance with my invention;

FIGURE 2 is a side and partially broken away section in elevation through a container of my construction which has been filled with suitable material to be dispensed and within whose open mouth a lid or closure has been preliminarily relatively loosely inserted;

FIGURE 3 is a view on the same scale and similar to FIGURE 2 illustrating a final step in securing and sealing a lid or closure with respect to and within the open mouth of the resin container. This figure shows heating means employed in accordance with my invention; and FIGURE 4 is a reduced side view in elevation and partial section showing a completed container assembly produced in accordance with my invention.

Referring particularly to FIGURE 1 of the drawings, I have illustrated a typical apparatus lay-out for carrying out my invention. A rotating table 10 is mounted on a rotating shaft 11 and carries a plurality of partible or hinged, outer-wall-forming molds 13a. It will be noted that each mold 13a is supported by an arm 13 that projects outwardly from the rotating shaft 11, so that each mold 13a moves with the table 10 during its rotation.

Melted charges or gobs of resin material are fed by a suitable feeder 12 at station A into each closed mold 13a and is then blow-formed, at such representative stations as B to F, by the use of a blow head 14a in a top-fitted relation over the mold. If desired, suitable heating means may be applied to the closed molds during the blow-forming operation. Each blow head 14a is supported by an arm 14 which is mounted on a concentric inner shaft 14b for raising and lowering movement with respect to the table 10. I have only illustrated the blow heads 14a at stations B to G for simplicity of illustration; at such stations the blow heads are in a "down" or blowing position. At stations H to A, the blow heads are in an "up" or raised, non-cooperating position on their shaft 14b and are thus not shown.

Resin containers are thus successively blow-formed from charges delivered by the feeder 12 at station A to provide a preliminary container or parison 16 at station G. In moving from station G to station H, the mold assembly 13a is opened to deliver the container 16 to a forwardly-downwardly-inclined chute 15 which in turn delivers it on a position ring 17 of a continuously but slowly moving belt conveyor 20 at station M. At station N, a feed means 18 is employed to fill the open mouth of the container with the desired material 19 such as cleansing powder, cold cream, etc., through a feeder head 18a. The feed means 18 has a slotted pivot mounting 18b, so that the container 16 may be filled during its movement from the left-hand dotted position through the full line central position and the right-hand dotted position of station N.

At station O, a relatively rigid or shape-retaining lid or closure 22 is then laid on top of the material 19 in a manner indicated in FIGURE 2. It will be noted that the lid or closure 22 employed in accordance with my invention does not have to have a tight fit about its periphery with the inner wall or periphery of the container 16, but may have a relatively loose fit when inserted.

After the filled container 16 has left station O and has moved to station P, a suitable heating means, such as radiant heater unit 25, cooperates therewith and moves with the container to the right-hand dotted position to effect the operation shown in FIGURE 3. At station Q, the side wall area adjacent the lip edge of the container is cooled or solidified and the completed container assembly 16′ is then ready for delivery to a storage or delivery area in the plant. As a result, a completed container or article 16′ with a tight, sealed-on lid or closure 22 is attained, as illustrated in FIGURE 4 of the drawings. It will be noted that the preliminary container 16 and the completed container 16′ are shown as having circular side walls that slightly slope or converge inwardly towards their wall ends, and that such (material-dispensing) wall ends are of rounded, convex outer contour.

From the above general description of the illustrated procedure and apparatus, it will be seen that I employ a closure or lid 22 which may be in the form of a flat disc. This disc may be press-formed from a suitable resin, such as polystyrene, or may be of a cardboard material. As explained above, the lid 22 need fit only by inserting loosely within the mouth of the expanded resin container 16 to rest in an abutting relation with the top surface of the material 19. Heat is applied about a localized side wall or lip or rim area or portion 16c of the open mouth of the container by suitable heating means, such as a radiant heater unit 25.

The unit 25, as illustrated in FIGURE 3, employs a radiant-heat-producing light tube 26 of annular shape or a series of individual heating light bulbs that are positioned within a downwardly-inwardly-inclined reflector 27 carried by the unit. As noted from the arrows in FIGURE 3, the heat is concentrated about lip or rim area portion 16c to cause the resin material to expand and thicken its walls to make the lid or closure 22 fit snugly within, lock and seal-off the mouth and, at the same time, produce a retaining ledge, ridge or annular rim flange 16d of reduced interior diameter of a suitable thickness and strength which will prevent the closure 22 from popping out when the container 16′ is dropped on the floor or otherwise subjected to rough handling. It will be noted that the rim area portion 16c, previously of substantially uniform diameter with respect to the side wall of the container 16, is expanded or shaped by the operation of FIGURE 3 into a retaining ridge or shoulder portion 16d of thickened section that provides a downward wedging action along its inner periphery on the lid 22 to securely hold the lid underside in tight abutment with the material 19 as well as its outer periphery edge in tight sealing abutment with the inner wall of the finished container 16′. The retaining portion 16d, when cooled or solidified, in effect, automatically locks the lid 22 in position; it has somewhat of a keystone shape, in that its inner surface inclines radially-inwardly toward the lip edge and its surface slightly inclines radially-outward from the side wall of the container toward its lip edge. Both the upper surface of the material 19 and the slight inward shape of the side wall which has been reduced in diameter adjacent the peripheral edge of the lid 22 by the heating action, aid in limiting the inward positioning of the lid within the container.

I have found that the concentrated application of a relatively small amount of heat that will increase the temperature of the lip portion 16c of an expanded resin container to about 260° F. will effect an expansion of the wall thickness of the lip portion 16c to form a retaining ledge portion 16d, involving an increase in diameter of the lip portion 16c of, for example, from about .050 inch to about .150 inch in cross sectional thickness, depending on how long the heat is applied. The illustrated expansion of thickness is represented by a period of application of a temperature of 260° F. for about one minute. If desired, as shown in FIGURE 2, the lip portion 16c may have a slightly greater length extent than desired for the ledge 16d so as to provide additional material for forming the ledge. This is particularly advantageous if the ledge is being formed from a non-expandable resin material. However, with a container formed of expanded resin beads, such as of polystyrene, I have found that this is not necessary in producing a ledge 16d.

I have found that a further advantage of the localized application of heat is that the expanded resin becomes harder and more rigid to thus increase the strength of the fitting or ledge portion 16d for the lid or closure 22. I have also discovered, and this is particularly true of a blow molded material, that the thickening of the wall takes place interiorly to decrease or pull-in the inside diameter more than to increase its outside diameter, as illustrated in FIGURE 3. This is highly important and advantageous and is believed to be caused by the memory characteristic of the resin, since it is formed from a gob of small diameter which is expanded by the blowing operation.

What I claim is:

1. In an open-mouth resin container having a side wall defining a lip edge about its open mouth, a closure lid positioned within the side wall adjacent and in a spaced relation below the lip edge, a retaining portion on the side wall between the lip edge and the lid of thickened diameter with respect to an adjacent main portion of relatively thin wall thickness of the side wall, said retaining portion being formed by a localized application of heat on the side wall adjacent the lip edge, and said retaining portion projecting radially inwardly of and beyond the side wall and securely locking the lid in position within the side wall adjacent the main portion thereof.

2. A resin container as defined in claim 1 wherein the hollow body is of expanded resin bead construction and is blow-formed to impart a memory characteristic to said side wall whereby the localized application of heat provides a thickening of said retaining portion.

3. In an open-mouth container of resin bead construction having a side wall defining a lip edge about its open mouth, a closure lid positioned within the inner periphery of the side wall adjacent the lip edge, a retaining portion on the side wall extending from the lip edge and along the inner periphery of said lid into a main portion of the side wall of relatively thin wall thickness, said retaining portion being of thickened diameter with respect to and radially-inwardly diverging from the main portion of the side wall toward the lip edge, said retaining portion being formed by a localized application of heat on the side wall adjacent the lip edge, and said retaining portion being of harder and more rigid resin material than the main portion of the side wall and securely locking the lid in position within the side wall adjacent the main portion thereof.

4. A resin container provided with a hollow body defined by a side wall whose major extent portion has a substantially uniform thin-wall thickness therealong, said side wall having a rounded inner side, said side wall terminating at one end in an end closure wall and at its opposite end in a lip edge about an open mouth portion to provide an open cavity for receiving a suitable material therein, a disk-like closure lid having a flat-faced rounded peripheral edge portion, said closure lid being positioned in an inwardly-spaced relation from said lip edge within the hollow body and with its rounded peripheral edge portion in tight sealing abutment with an inner circumferential portion of said side wall that has been deformed radially-inwardly by a localized application of heat thereto, a circumferential retaining portion formed by the localized application of heat from and of thicker cross section than said side wall and extending from said lip edge to said closure lid; and said retaining portion having a wedge-shape in cross section, declining in thickness radially-inwardly towards said closure lid, and merging adjacent said closure lid into the major extent portion of substantially uniform thickness of said side wall to securely lock-position said closure lid within said side wall for retaining the material within the cavity of the hollow body.

5. A resin container as defined in claim 4 wherein said side wall is of expanded resin bead material and its major extent portion of substantially uniform thickness slopes radially-inwardly into said end closure wall.

6. A resin container as defined in claim 4 wherein, said closure lid on its underside rests on the material within the cavity of the hollow body, said retaining portion is of keystone shape which converges in cross section along its inner and outer sides from said lip edge towards said closure lid, and said hollow body is of expanded resin bead construction.

References Cited by the Examiner

UNITED STATES PATENTS

| | | | |
|---|---|---|---|
| 2,488,212 | 11/1949 | Lloyd | 229—48 |
| 2,677,318 | 5/1954 | Torudd et al. | 229—5.5 X |
| 2,843,651 | 7/1958 | Southworth | 220—81 X |
| 3,007,603 | 11/1961 | Krehl | 220—67 |
| 3,088,586 | 5/1963 | Hardman | 206—47 |
| 3,100,592 | 8/1963 | Orr | 229—2.5 |
| 3,190,530 | 6/1965 | Edwards | 229—2.5 X |

LOUIS G. MANCENE, *Primary Examiner.*